United States Patent
Chung

(10) Patent No.: US 10,229,545 B2
(45) Date of Patent: Mar. 12, 2019

(54) WATCH-TYPE MOBILE TERMINAL AND CONTROLLING METHOD THEREOF

(71) Applicant: LG ELECTRONICS INC., Seoul (KR)

(72) Inventor: Sooyon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 15/299,367

(22) Filed: Oct. 20, 2016

(65) Prior Publication Data

US 2017/0154477 A1 Jun. 1, 2017

(30) Foreign Application Priority Data

Dec. 1, 2015 (KR) .......................... 10-2015-0170000

(51) Int. Cl.
*G07C 5/00* (2006.01)
*G07C 5/08* (2006.01)
(Continued)

(52) U.S. Cl.
CPC ........... *G07C 5/008* (2013.01); *G07C 5/0866* (2013.01); *G08B 5/225* (2013.01); *G08B 5/228* (2013.01);
(Continued)

(58) Field of Classification Search
CPC ...... G07C 5/008; G07C 5/0866; G08B 5/225; G08B 5/228; G11B 20/10527;
(Continued)

(56) References Cited

U.S. PATENT DOCUMENTS

| 9,979,924 | B1 * | 5/2018 | Fink | ..................... H04N 5/9201 |
| 2007/0219685 | A1 * | 9/2007 | Plante | ..................... G07C 5/008 |
| | | | | 701/33.4 |
| 2012/0217764 | A1 * | 8/2012 | Ishiguro | ..................... B60R 1/00 |
| | | | | 296/1.07 |
| 2014/0142816 | A1 * | 5/2014 | Moebus | ..................... B60Q 3/18 |
| | | | | 701/49 |
| 2014/0169754 | A1 * | 6/2014 | Jarvinen | ........... G06F 17/30026 |
| | | | | 386/230 |

(Continued)

FOREIGN PATENT DOCUMENTS

| WO | 2015019360 | 2/2015 |
| WO | 2015099500 | 7/2015 |

OTHER PUBLICATIONS

PCT International Application No. PCT/KR2016/012738, Notification of Transmittal of the International Search Report and the Written Opinion of the International Searching Authority, or Declaration dated Apr. 12, 2017, 18 pages.

Primary Examiner — Huy T Nguyen
(74) *Attorney, Agent, or Firm* — Lee, Hong, Degerman, Kang & Waimey PC

(57) ABSTRACT

Disclosed are a mobile terminal of a watch type and controlling method thereof. The present invention includes a display unit, a sensing unit, a communication unit configured to transmit/receive a signal with a vehicle accident recording device, and a controller controlling the display unit, the sensing unit and the communication unit, wherein if a state change of a user is sensed, an image request signal for requesting an image is transmitted to the vehicle accident recording device, wherein the image corresponds to at least one of a moving image and a still image corresponding to a first time point of sensing the state change, and wherein if the image is received from the vehicle accident recording device, a notification indicating that the image is received is
(Continued)

provided. Accordingly, a photographed image is received from a vehicle accident recording device in case of sensing user's state change.

18 Claims, 17 Drawing Sheets

(51) Int. Cl.
*G08B 5/22* (2006.01)
*H04N 5/77* (2006.01)
*G11B 20/10* (2006.01)
*G11B 27/00* (2006.01)
*H04N 5/775* (2006.01)

(52) U.S. Cl.
CPC ...... *G11B 20/10527* (2013.01); *G11B 27/005* (2013.01); *H04N 5/77* (2013.01); *H04N 5/775* (2013.01); *G11B 2020/10833* (2013.01)

(58) Field of Classification Search
CPC ........ G11B 27/005; G11B 2020/10833; H04N 5/77; H04N 5/775
See application file for complete search history.

(56) References Cited

U.S. PATENT DOCUMENTS

| | | | |
|---|---|---|---|
| 2014/0306826 A1 | 10/2014 | Ricci | |
| 2015/0065082 A1* | 3/2015 | Sehgal | H04W 4/90 455/404.2 |
| 2015/0084757 A1 | 3/2015 | Annibale et al. | |
| 2015/0193172 A1* | 7/2015 | Hokari | G06F 3/0604 709/213 |
| 2015/0332031 A1 | 11/2015 | Misty et al. | |
| 2015/0350613 A1* | 12/2015 | de Swardt | B60R 1/00 348/148 |

* cited by examiner

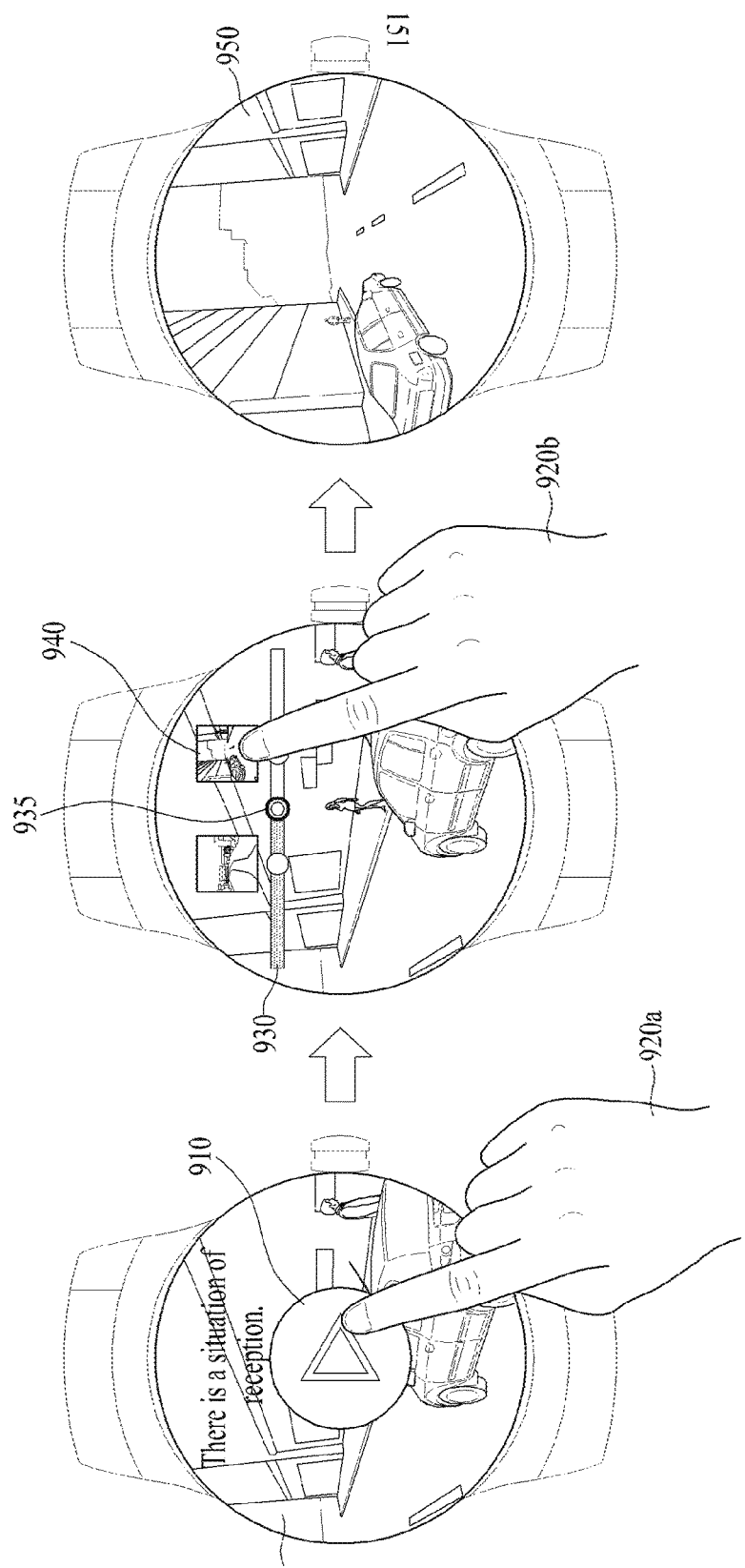

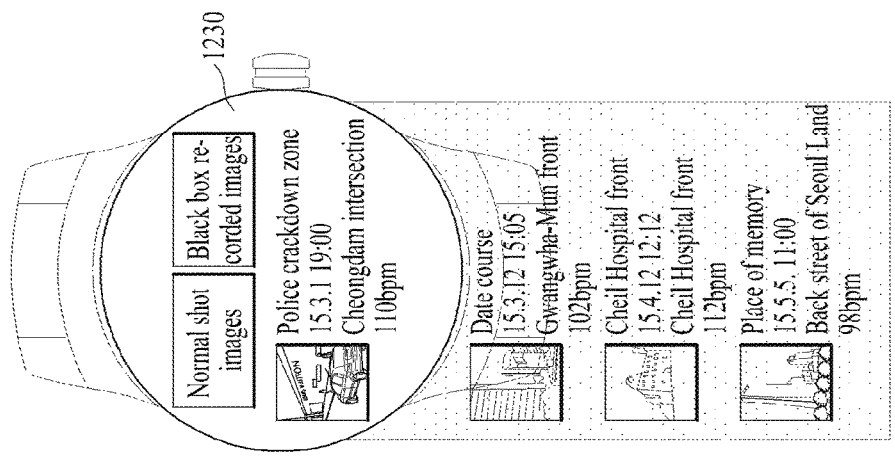
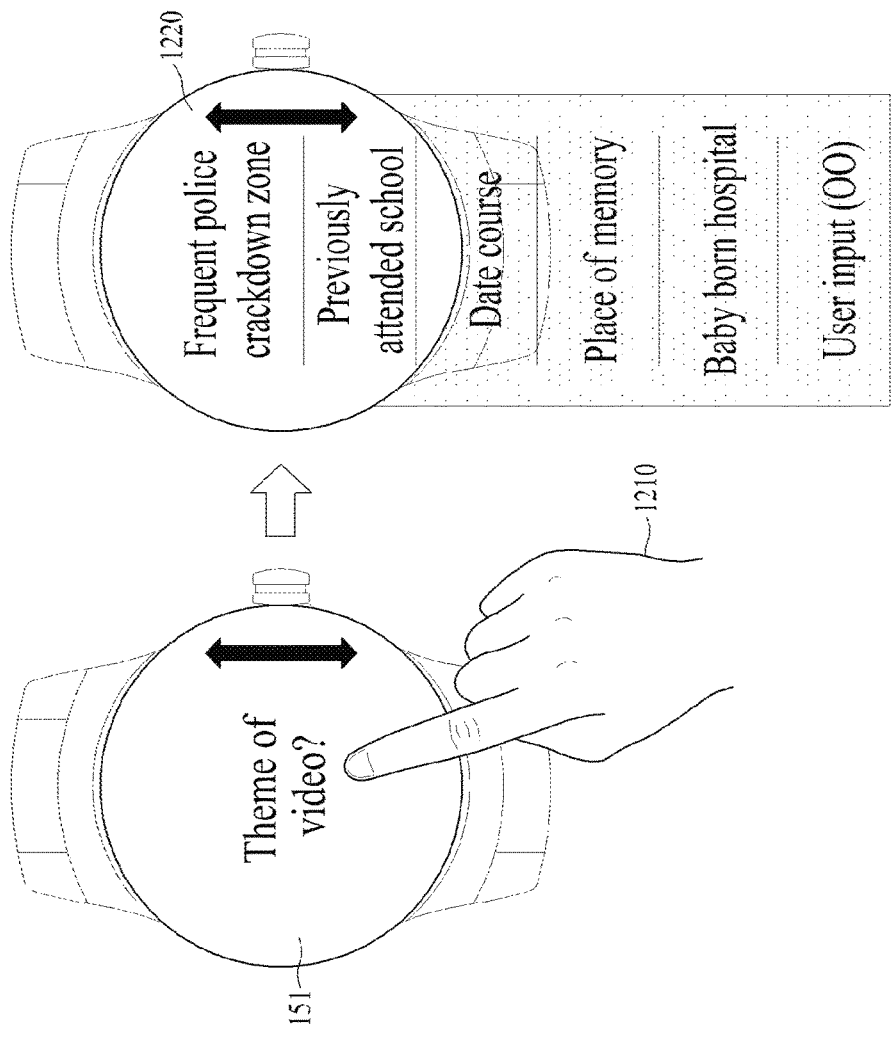
FIG. 12B
FIG. 12A

WATCH-TYPE MOBILE TERMINAL AND CONTROLLING METHOD THEREOF

Pursuant to 35 U.S.C. § 119(a), this application claims the benefit of earlier filing date and right of priority to Korean Application No. 10-2015-0170000, filed on Dec. 1, 2015 the contents of which are hereby incorporated by reference herein in its entirety.

BACKGROUND OF THE INVENTION

Field of the Invention

The present invention relates to a mobile terminal, and more particularly, to a mobile terminal of a watch type and controlling method thereof. Although the present invention is suitable for a wide scope of applications, it is particularly suitable for receiving a photographed image from a vehicle accident recording device in case of sensing user's state change.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, a video recorded by a vehicle black box is not used unless such an event as a car accident occurs in the course of driving a vehicle. When a vehicle driver drives a vehicle by wearing a mobile terminal of a watch type, the demand for a method of obtaining a video of a black box by real time based on a biometric signal sensed by the mobile terminal of the watch type and providing the obtained video to a user is rising.

SUMMARY OF THE INVENTION

Accordingly, embodiments of the present invention are directed to a mobile terminal of a watch type and controlling method thereof that substantially obviate one or more problems due to limitations and disadvantages of the related art.

One object of the present invention is to provide a mobile terminal of a watch type and controlling method thereof, by which a video or image recorded by a vehicle accident recording device can be obtained by real time based on user's state change.

Another object of the present invention is to provide a mobile terminal of a watch type and controlling method thereof, by which a moving image or a still image related to user's state change can be provided later in association with a place information.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal of a watch type according to one embodiment of the present invention may include a display unit, a sensing unit, a communication unit configured to transmit/receive a signal with a vehicle accident recording device, and a controller controlling the display unit, the sensing unit and the communication unit, wherein if a state change of a user is sensed, an image request signal for requesting an image is transmitted to the vehicle accident recording device, wherein the image corresponds to at least one of a moving image and a still image corresponding to a first time point of sensing the state change, and wherein if the image is received from the vehicle accident recording device, a notification indicating that the image is received is provided.

In another aspect of the present invention, as embodied and broadly described herein, a method of controlling a mobile terminal of a watch type according to another embodiment of the present invention may include the steps of if a state change of a user is sensed, transmitting an image request signal for requesting an image to a vehicle accident recording device and if the image is received from the vehicle accident recording device, providing a notification indicating that the image is received, wherein the image corresponds to at least one of a moving image and a still image corresponding to a first time point of sensing the state change.

In another aspect of the present invention, as embodied and broadly described herein, a watch-type mobile terminal may include a display, a sensor, a communication unit configured to transceive information with a vehicle accident recorder, and a controller configured to cause an image request, requesting an image, to be transmitted to the vehicle accident recorder via the communication unit when a user state change is sensed via the sensor, wherein the image corresponds to at least a moving image or a still image corresponding to a first time point related to the user state change, and cause the display to display a notification when the image is received from the vehicle accident recorder.

In another aspect of the present invention, as embodied and broadly described herein, a method of controlling a watch-type mobile terminal, the method include the steps of transmitting an image request to a vehicle accident recorder when a user state change is sensed, and providing a notification indicating that the image is received when the image is received from the vehicle accident recorder, wherein the image corresponds to at least a moving image or a still image corresponding to a first time point related to the user state change.

Accordingly, the present invention provides the following effects and/or features.

According to at least one of embodiments of the present invention, a moment a user desires to memorize in the course of driving a vehicle can be obtained through an image recorded in a vehicle accident recording device.

According to at least one of embodiments of the present invention, while a vehicle is driven, although a situation is not recognized an event by a vehicle accident recording device, it is able to obtain an image shot by the vehicle accident recording device in a manner of sensing a state change of a driver.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 9 is a diagram for one example of playing a video received from a vehicle accident recording device in a mobile terminal of a watch type according to one embodiment of the present invention;

FIGS. 12A and 12B are diagrams for one example of setting a theme of a video received from a vehicle accident recording device in a mobile terminal of a watch type according to one embodiment of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
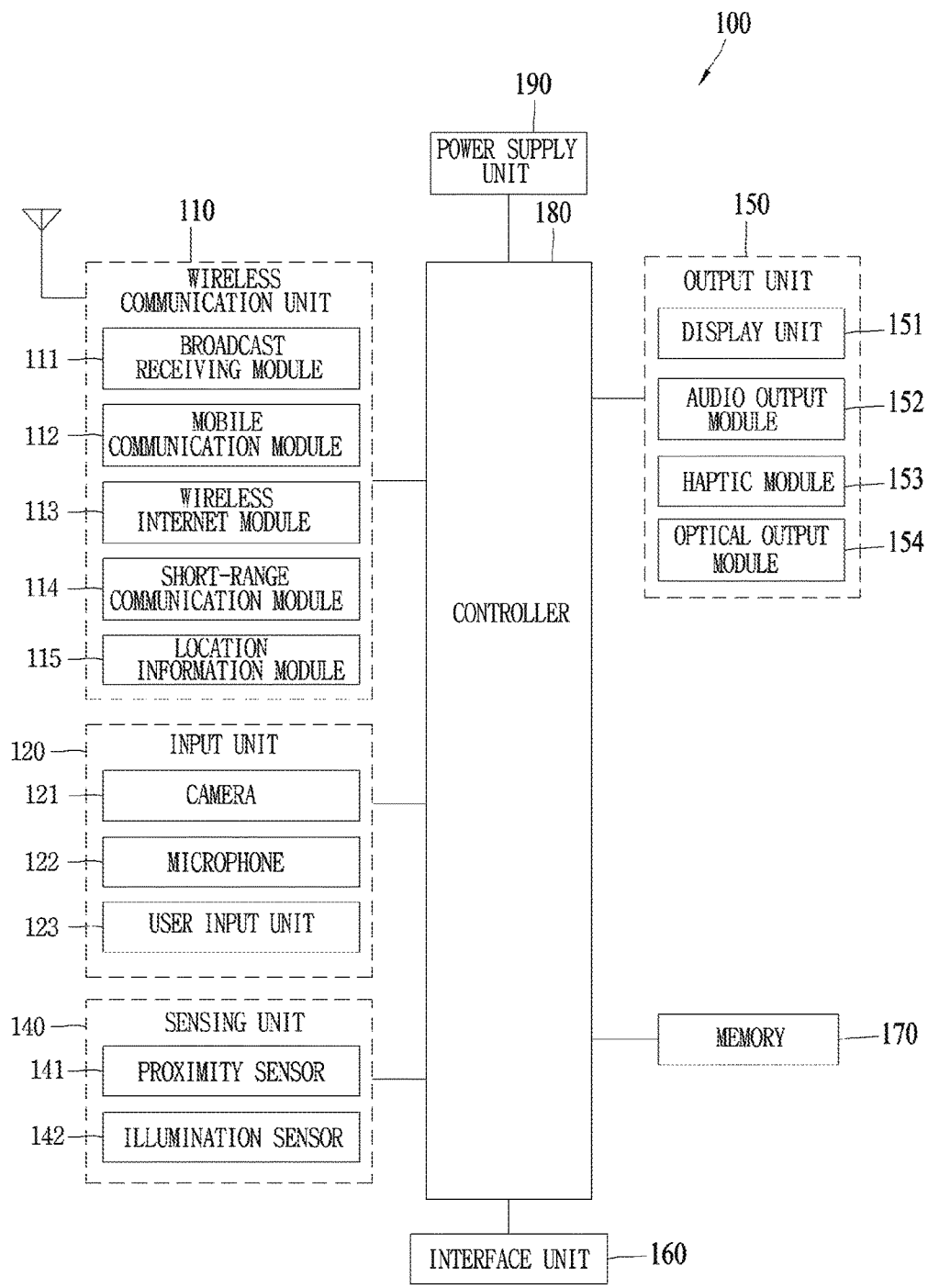
FIG. 1A is a block diagram of a mobile terminal in accordance with the present disclosure.
Figure 1B:
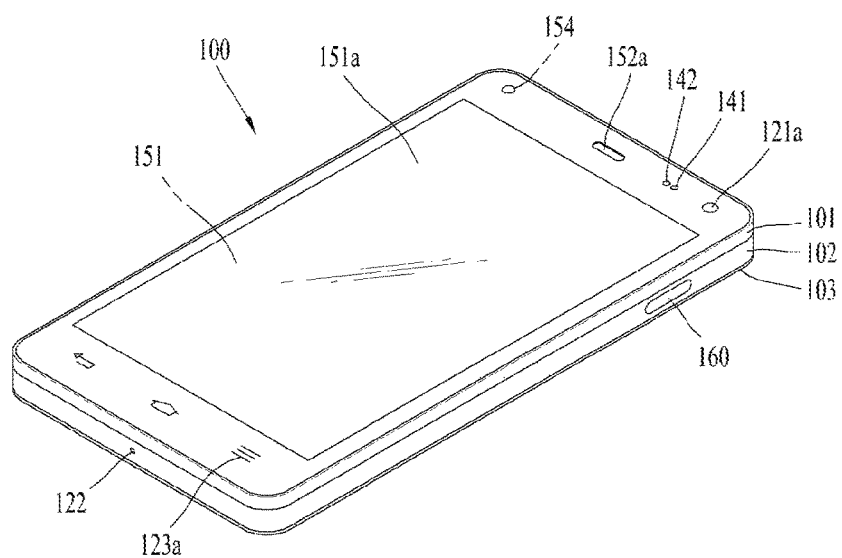
FIGS. 1B and 1C are conceptual views of one example of the mobile terminal, viewed from different directions.
Figure 1C:
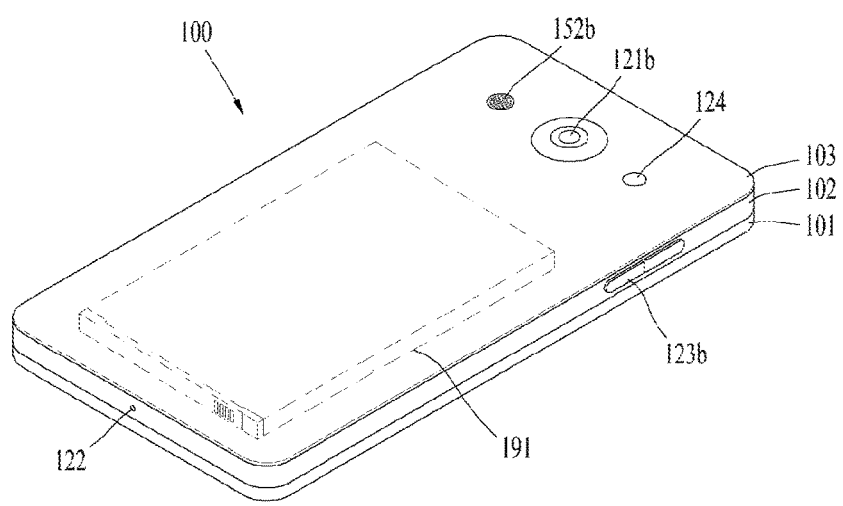

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and informations inputted or outputted through the components mentioned in the foregoing description, or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the $1^{st}$ audio output unit 152a, the $2^{nd}$ audio output unit 152b, the proximity sensor 141, the illumination sensor 142, the optical output unit 154, the $1^{st}$ camera 121a, the $2^{nd}$ camera 121b, the $1^{st}$ manipulating unit 123a, the $2^{nd}$ manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, according to the present invention, it is able to display information processed in a mobile terminal using a flexible display. This shall be described in detail with reference to the accompanying drawings as follows.

Figure 2:
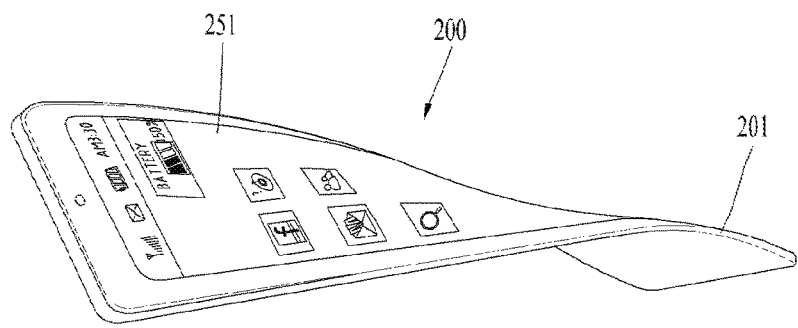
FIG. 2 is a conceptual view of a deformable mobile terminal according to an alternative embodiment of the present disclosure.

FIG. 2 is a conceptual view of a deformable mobile terminal according to an alternative embodiment of the present invention.

In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 251 is not deformed (for example, in a state with an infinite radius of curvature and referred to as a first state), a display region of the flexible display unit 251 includes a generally flat surface. When in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
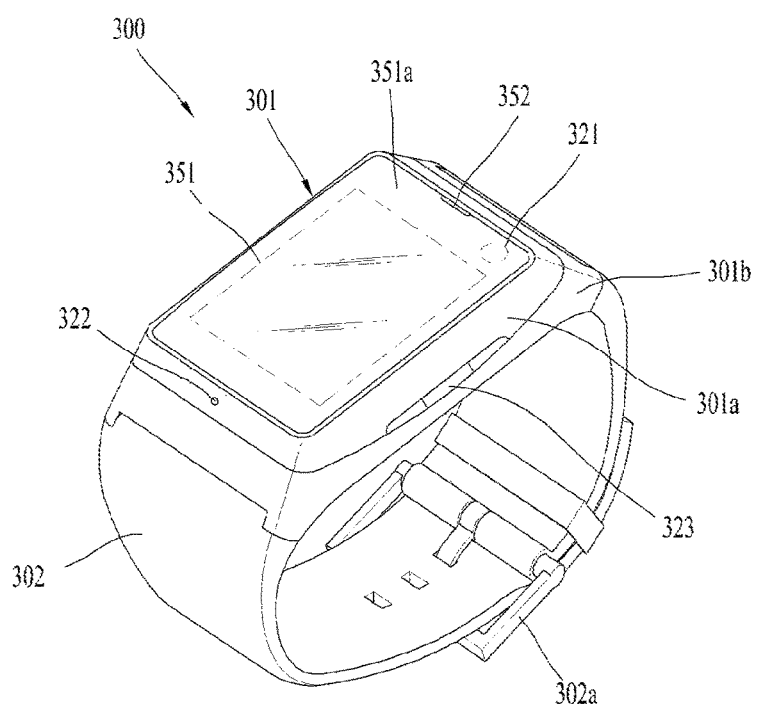
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
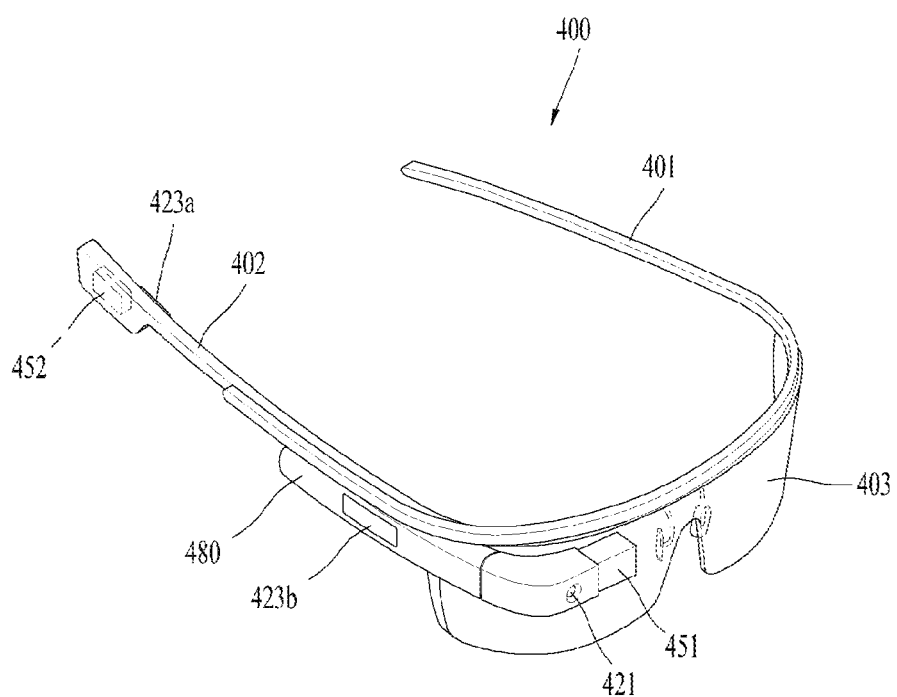
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

According to the following embodiments described with reference to FIGS. 5 to 16, if a state change of a user is sensed in a mobile terminal of a watch type, a method of obtaining and providing an image recorded in a vehicle accident recording device at a time point of sensing the state change is shown.

Figure 5:
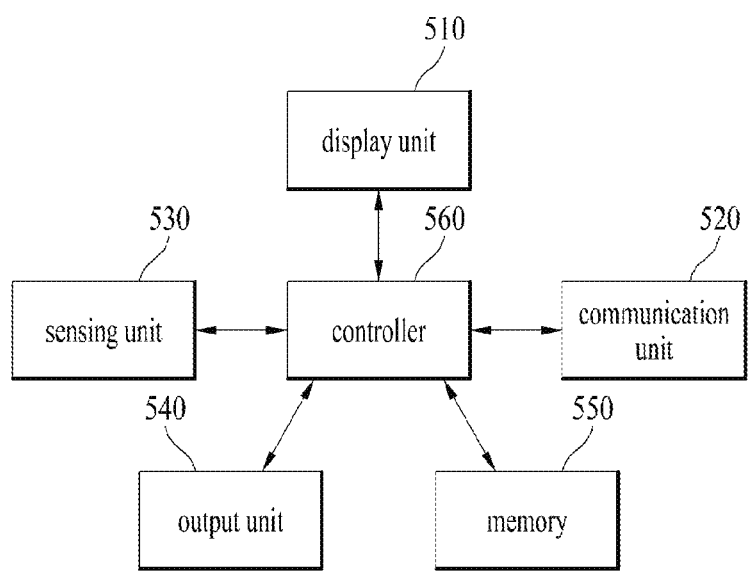
FIG. 5 is a block diagram of configurations modules of a mobile terminal of a watch type according to one embodiment of the present invention.

FIG. 5 is a block diagram of configurations modules of a mobile terminal of a watch type according to one embodiment of the present invention.

Referring to FIG. 5, a watch type mobile terminal (hereinafter called 'mobile terminal') 500 may include a display unit 510, a communication unit 520, a sensing unit 530, an output unit 540, a memory 550, and a controller 560. Moreover, as all the components shown in FIG. 5 are not necessary to embody the mobile terminal, the mobile terminal disclosed in the present specification may include components more or less than those mentioned in the above description.

The display unit 510 can display visual information. In this case, the visual information may include at least one of a content, an application, an image, a video and the like. Moreover, based on a control command of the controller 550, the display unit 510 can output the visual information to a screen. According to the present invention, the display unit 510 may be embodied with the display 151 shown in FIG. 1A. According to the present invention, the display unit 510 can output at least one of a moving image and a still image received from an external device.

The communication unit 520 performs a communication with an external device using various protocols and is able to transmit/receive data. And, the communication unit 520 accesses a network by wire or wireless and is then able to transmit/receive digital data of contents and the like. According to the present invention, the communication unit 520 may be embodied with the wireless communication unit 140 shown in FIG. 1A. According to the present invention, the communication unit 520 can transmit/receive data with a vehicle, a vehicle accident recording device, an external mobile terminal and the like. This shall be described in detail again with reference to FIG. 6 later.

The sensing unit 530 senses user's various inputs and an environment of the mobile terminal and is then able to deliver the sensing results to enable the controller 560 to perform operations according to the delivered sensing results. According to the present invention, the sensing unit 530 may be embodied with a touchscreen provided to the display unit 510. According to the present invention, the sensing unit 530 may include a touch sensor, a microphone, an acceleration sensor, a gyroscope sensor, a PPG (photoplethysmorgram) sensor, a GPS sensor, and the like. According to one embodiment, the sensing unit 530 can sense user's input signal for the display unit through the touch sensor. And, the sensing unit 530 can sense user's voice input or an external voice through the microphone. And, the sensing unit 530 can sense a sway or shaking of the mobile terminal through the acceleration sensor or the gyroscope sensor. Moreover, according to the present invention, the sensing unit 530 may be embodied with the sensing unit 140 or the input unit 120 shown in FIG. 1A.

The output unit 540 can output various signals generated from the mobile terminal 500. For instance, the mobile terminal 500 according to the present invention can output an audio signal or a vibration signal. And, according to the present invention, the output unit 540 may be embodied with the former output unit 150 shown in FIG. 1A.

The memory 550 stores data supportive of various functions of the mobile terminal 500. The memory 550 can store a multitude of application programs, applications, data for operations of the mobile terminal, commands and the like. According to the present invention, the memory 550 can include a memory installed inside the mobile terminal, a memory provided outside the mobile terminal, and the like. Moreover, according to the present invention, the memory 550 can store images received from a vehicle accident recording device.

The controller 560 processes data, controls the above-mentioned units of the mobile terminal, and is able to control data transmissions/receptions between the units. According to the present invention, the controller 560 may be embodied with the former controller 180 shown in FIG. 1A.

According to the present invention, if user's state change is sensed through the sensing unit 530, the controller 550 can control an image request signal to be transmitted to the vehicle accident recording device through the communication unit 520. Moreover, according to the present invention, if the image is received from the vehicle accident recording device, the controller 560 can control the received image to be outputted to the display unit 510. According to one embodiment of the present invention, operations performed by the mobile terminal can be controlled by the controller 560. For clarity of the following descriptions with reference to the accompanying drawings, such operations are commonly depicted and described as performed/controlled by the mobile terminal.

Figure 6:
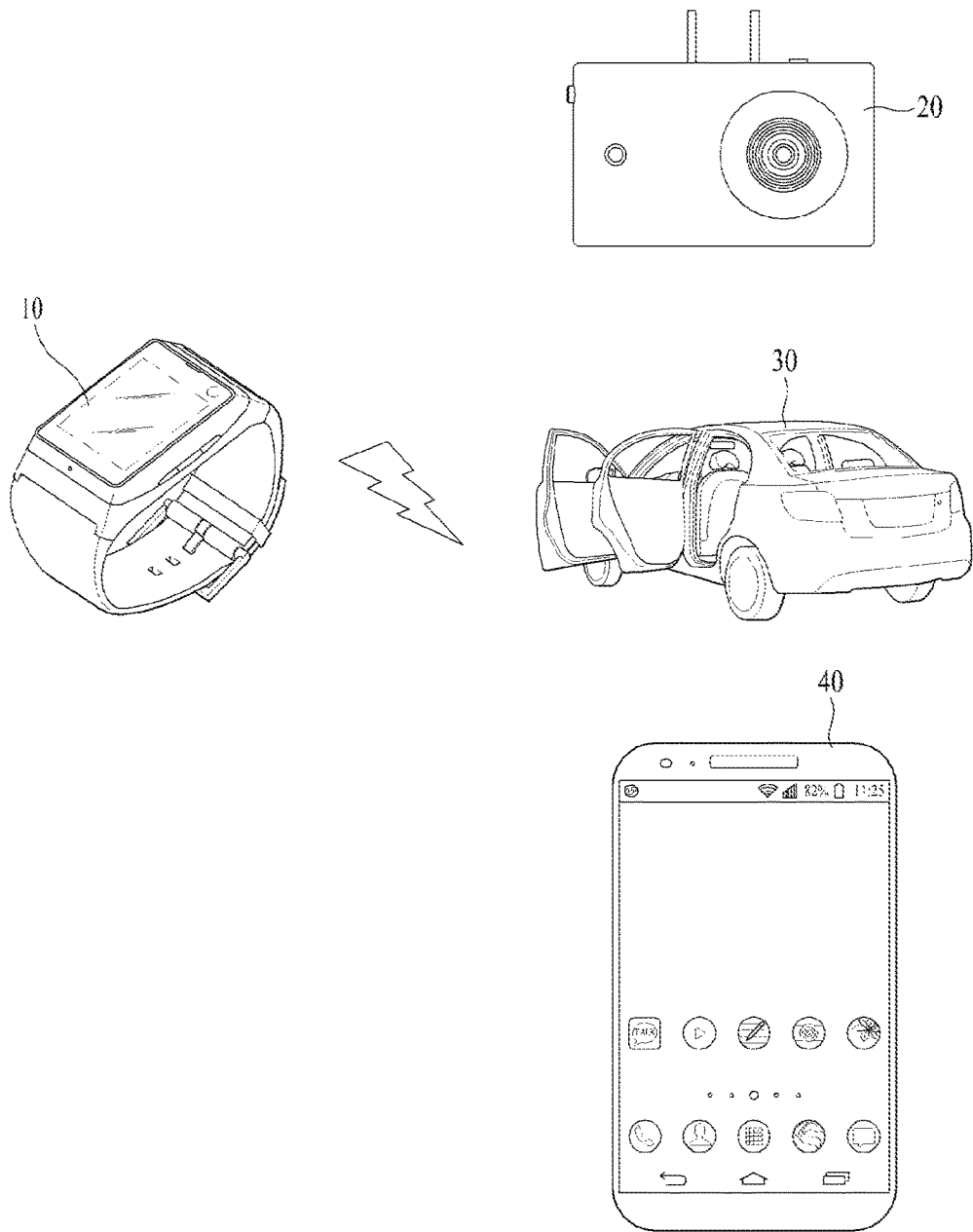
FIG. 6 is a diagram for one example of an external device connectable to a mobile terminal of a watch type according to one embodiment of the present invention.

FIG. 6 is a diagram for one example of an external device connectable to a mobile terminal of a watch type according to one embodiment of the present invention.

Referring to FIG. 6, a mobile terminal 10 is connected to various external devices and is able to transmit/receive controls signals with the connected external devices. In this case, the external devices may include various devices capable of transmitting/receiving data with the mobile terminal 10. For instance, according to the present invention, the external devices may include a vehicle accident recording device 20, a vehicle 30, and an external mobile terminal (e.g., smartphone) 40. Configuration modules of the vehicle accident recording device 20 shall be described in detail with reference to FIG. 7 later.

Meanwhile, the mobile terminal 10 and the external device can perform a pairing. In this case, the pairing means a connection for data transmission/reception between the mobile terminal 10 and the external device. In case of performing the pairing, as the mobile terminal 10 and the external device perform a communication access, thereby enabling data transmission and reception interactively. The pairing can be performed by Bluetooth, NFC and the like. And, the pairing can be performed by one of various systems performed by the wireless communication unit described with reference to FIG. 1A.

According to the present invention, the mobile terminal 10 can transmit and receive various data by performing the pairing with at least one external device. In particular, while the mobile terminal is simultaneously paired with the vehicle accident recording device 20, the vehicle 30 and the external mobile terminal 40, the mobile terminal 10 can transmit and receive data. According to the embodiments shown in FIGS. 8 to 16, assume that the mobile terminal is in a paired state with at least one of the above-mentioned external devices.

Figure 7:
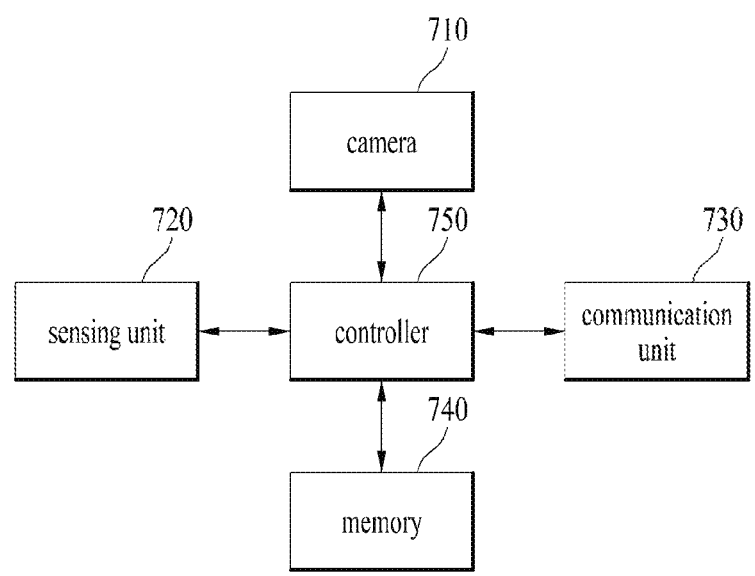
FIG. 7 is a block diagram of configuration modules of a vehicle accident recording device related to the present invention.

FIG. 7 is a block diagram of configuration modules of a vehicle accident recording device related to the present invention.

Referring to FIG. 7, in case that an event occurs in a vehicle, a vehicle accident recording device 700 corresponds to a device configured to record and provide information required for situation determination. For instance, the vehicle accident recording device 700 corresponds to a device configured to provide information required for realizing accident circumstances by recording situations before and after collision of a vehicle. For instance, the vehicle accident recording device 700 may correspond to a vehicle (or car) black box.

The vehicle accident recording device 700 may include a camera 710, a sensing unit 720, a communication unit 730, a memory 740 and a controller 750. Moreover, as all the components shown in FIG. 7 are not necessary to embody the vehicle accident recording device, the vehicle accident recording device mentioned in the description of the present invention may include components more or less than those mentioned in the above description.

First of all, the camera 710 can photograph circumstances related to a vehicle. In response to a control signal, the camera 710 can photograph an image sensed within a view angle area into a moving image or a still image. And, the camera 710 may be installed inside or outside the vehicle. Meanwhile, the camera 710 may include a $1^{st}$ camera and a $2^{nd}$ camera. For instance, the $1^{st}$ camera may be configured to photograph a view in front of the vehicle, while the $2^{nd}$ camera may be configured to photograph a view in rear of the vehicle.

The sensing unit 720 includes various sensors provided to the vehicle and is configured to collect various kinds of informations related to a driving of the vehicle. For instance, the sensing unit 720 may include a shock sensor configured to sense a shock of the vehicle, an obstacle detection sensor configured to sense other nearby vehicles and/or obstacles, a braking sensor configured to sense a brake signal and a braking distance, a vehicle speed sensor, a GPS sensor configured to obtain a location of the vehicle, and the like. If the sensing unit 720 provides the controller 750 with a detected sensor value, the controller 750 can determine whether an accident of the vehicle has occurred, based on the sensor value.

The communication unit 730 can send information related to a state of the vehicle to a mobile terminal by wired or wireless communication. For instance, the communication unit 730 may send the information by wireless communication using Bluetooth, Zigbee, Wi-Fi and the like or may send the information related to the vehicle state to the mobile terminal by wireless communication suing RS-232, RS-485, USB, CAN and the like. According to the present invention, the communication unit 730 can send a photographed video or still image to the mobile terminal.

The memory 740 can store the video or still image photographed through the camera 710.

The controller 750 can control overall operations of the vehicle accident recording device 700. The controller 750 can determine a presence or non-presence of accident occurrence through a sensor value detected through the sensing unit 7320. Moreover, the controller 750 can determine a video recording start time point based on at least one of the detected sensor value and a control signal received from the mobile terminal.

In association with a video recording, the vehicle accident recording device 700 can include various video recording modes such as a continuous (always-on) video recording mode, a shock mode, a parking mode, a manual mode and the like. The continuous (always-on) video recording mode corresponds to a mode for continuously making a video recording of a vehicle driving in general. The shock mode corresponds to a mode for making a video recording during a preset time before and after an accident occurrence. The parking mode corresponds to a mode for making a video recording in a vehicle parked situation. And, the manual mode corresponds to a mode for manipulating a start of a video recording manually. According to the present invention, assume that the vehicle accident recording device 700 is in the continuous (always-on) video recording mode.

Moreover, the vehicle accident recording device 20 may further include a display unit, an output unit and the like [not shown in FIG. 7].

Meanwhile, the vehicle 30 may include a sensing unit, a communication unit, a controller and the like as configuration modules [not shown in FIG. 7]. Moreover, as all the components mentioned in the above description are not necessary to embody the vehicle, the vehicle mentioned in the description of the present invention may include components more or less than those mentioned in the above description.

According to the present invention, the sensing unit of the vehicle 30 can sense whether a user is on board. For instance, through a weight detection sensor provide to a seat of the vehicle 30, if a sensed weight lies within a preset weight range, the vehicle 30 can determine that the user is on board. Moreover, for instance, if the vehicle 30 and the mobile terminal 10 worn by the user are already paired with each other or a strength of a signal between the vehicle 30 and the mobile terminal 10 fails to correspond to a preset range, the vehicle 30 can determine that the user has alighted from the vehicle 30.

Moreover, according to the present invention, the communication unit of the vehicle 30 can send data indicating whether a user is on board to the mobile terminal. Moreover, according to the present invention, the controller of the vehicle 30 can control overall operations of the vehicle 30.

Figure 8A:
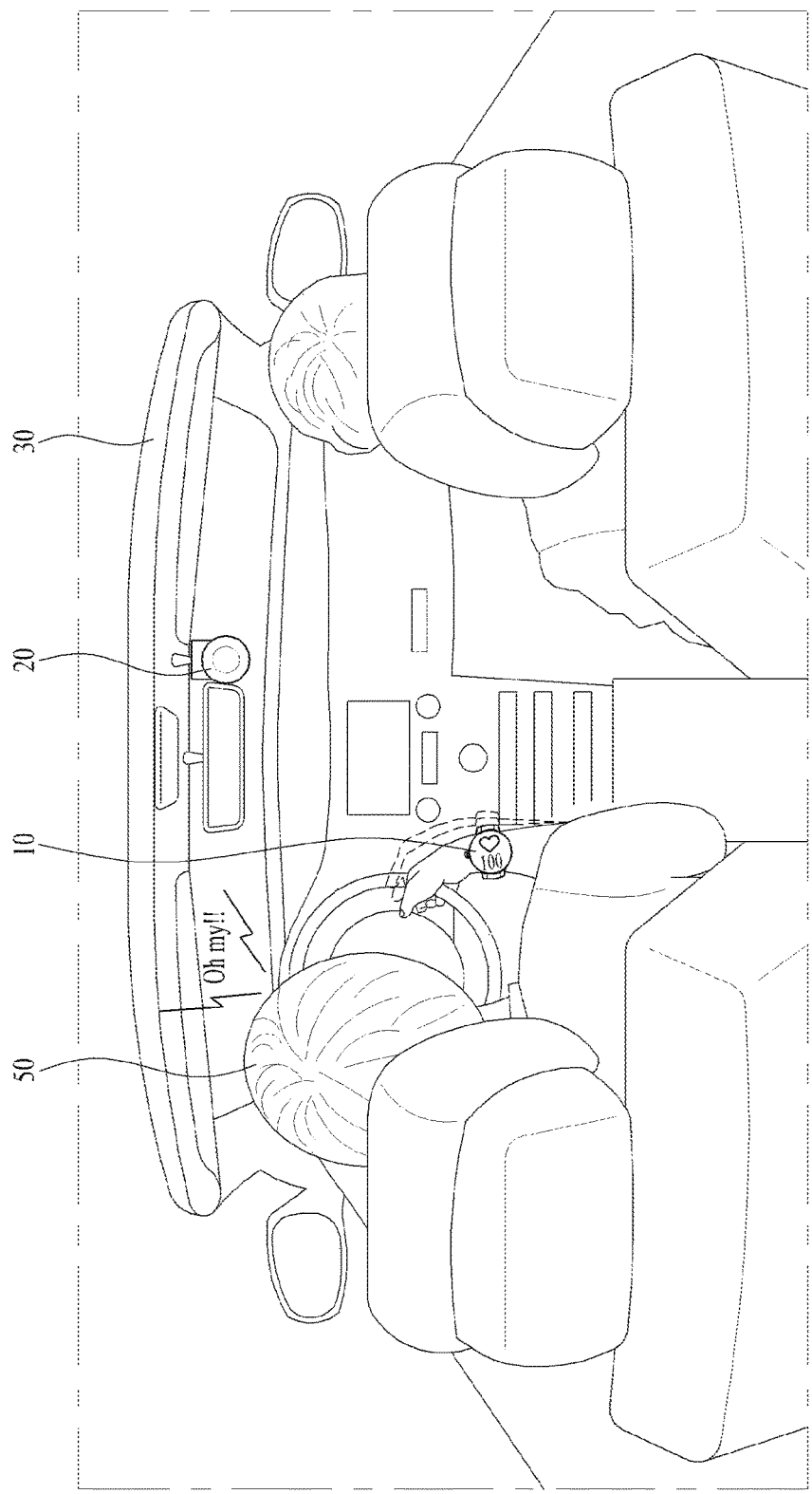
FIG. 8A is a diagram for one example of sensing a state change of a user in a mobile terminal of a watch type according to one embodiment of the present invention.

FIG. 8A is a diagram for one example of sensing a state change of a user in a mobile terminal of a watch type according to one embodiment of the present invention. According to the embodiment shown in FIG. 8A, assume that a mobile terminal 10 is currently paired with a vehicle accident recording device 20 and a vehicle 30.

Referring to FIG. 8A, the mobile terminal can sense whether a user is on board (the vehicle). Regarding this, if a preset weight is sensed from a seat of the vehicle through a sensor of the vehicle or a pre-registered device is detected as entering the vehicle, a controller of the vehicle 30 can determine that the user is on board. In this case, the vehicle 30 can send a signal, which indicates that the user is on board, to the mobile terminal 10. Moreover, in response to the signal received from the vehicle 30, the mobile terminal 10 can determine that the user 50 is currently on the vehicle 30.

Moreover, the mobile terminal can sense whether the mobile terminal is worn or not. Regarding this, based on whether a buckle provided to the mobile terminal is locked, whether a signal is sensed from a rear side of the mobile terminal, the mobile terminal 10 can determine whether it is worn by a user. According to the embodiment shown in FIG. 8, assume that the mobile terminal 10 is currently worn on a wrist of the user 50.

In doing so, the mobile terminal 10 can sense whether a state of the user 50 is changed. In particular, according to the embodiment shown in FIG. 8, while the user 50 is on the vehicle 30 by wearing the mobile terminal 10, the mobile terminal 10 can sense a state change of the user 50. In this case, the state change may include a level change of a biometric change voice input, a shaking change of the mobile terminal, or the like. The state change mentioned in the above description may become a reference for recognizing an excited state of a user. Moreover, the biometric change may include a change of a stress index of a user, a heart rate change of a user and the like.

For instance, if a heart rate of the user 50 increases by exceeding a preset range, the mobile terminal 10 can recognize it as a state change. For instance, the mobile terminal 10 can measure a heart rate of the user 50 through a PPG sensor provided to the sensing unit. Generally, a normal human heart rate amounts to 50 bpm to 100 bpm. According to the present invention, the preset range of the heart rate is set lower than 100 bpm, by which the preset range of the heart rate is non-limited.

For another instance, if a stress index of the user 50 increases by exceeding a preset range, the mobile terminal 10 can recognize it as a state change. For instance, it is able to obtain the stress index through HRV (heart rate variability). Alternatively, it is able to obtain the stress index of the user 50 through one of various methods.

For another instance, if a shaking of the mobile terminal 10 exceeds a preset range, the mobile terminal 10 can recognize it as a state change. For instance, as the mobile terminal 10 has the sensing unit provided with a gyroscope sensor and an acceleration sensor, it is able to sense the shaking of the mobile terminal 10. The reason for this is that, if the emotion of the user 50 changed into an excited state, a motion of an arm having the mobile terminal 10 worn thereon may become violent.

For further instance, if a voice signal sensed by the mobile terminal 10 exceeds a preset range, the mobile terminal 10 can recognize it as a state change. The mobile terminal 10 can sense a voice signal of the user 50 through a microphone provided to the sensing unit. For instance, if the user 50 senses a rapid vehicle change or has an emotional change, the mobile terminal 10 can recognize that the user 50 speaks louder than usual. For instance, if a voice signal exceeds a preset range, it may correspond to a case of a sound that exceeds 80 dB. Moreover, for instance, the vehicle accident recording device 20 senses a voice signal of the user 50 through a microphone provided to the sensing unit and is then able to send the sensed voice signal to the mobile terminal 10.

Subsequently, if the state change of the user 50 is sensed, the mobile terminal 10 can send an image request signal for requesting an image to the vehicle accident recording device 20. In this case, the image may include a still image or a moving image. In particular, the mobile terminal 10 can send the vehicle accident recording device 20 a signal for requesting at least one of a moving image and a still image taken during a preset period before and after a time point of sensing the state change of the user 50.

If the vehicle accident recording device 20 receives the image request signal from the mobile terminal 10, the vehicle accident recording device 20 can send the mobile terminal 10 an image amounting to the preset period before and after the time point of sensing the state change of the user 50. As mentioned in the foregoing description with reference to FIG. 7, since the vehicle accident recording device 20 is in the continuous (always-on) video recording mode, the mobile terminal 10 can obtain a video prior to sensing the state change of the user 50 from the vehicle accident recording device 20. This shall be described in detail with reference to FIG. 9 later.

On the other hand, while the vehicle accident recording device 20 and an external mobile terminal (not shown in the drawing) are paired with each other, the vehicle accident recording device may send the external mobile terminal (not shown in the drawing) an image during a preset period before and after the time point of sensing the state change of the user 50 [not shown in FIG. 8A]. This shall be described in detail with reference to FIG. 15 later.

Figure 8B:
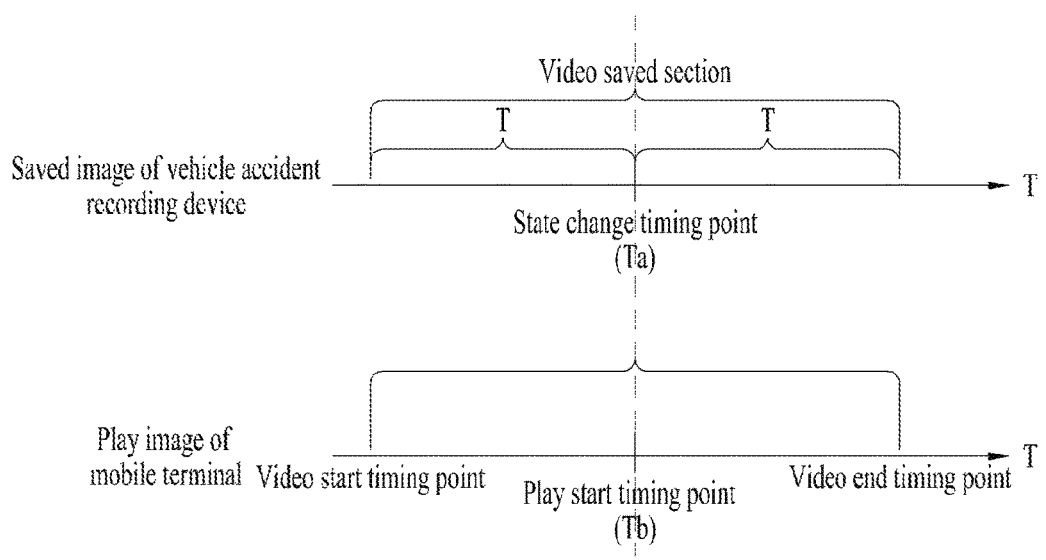
FIG. 8B is a diagram of a relation between a saved video of a vehicle accident recording device and a video played in a mobile terminal of a watch type according to one embodiment of the present invention.

FIG. 8B is a diagram of a relation between a saved video of a vehicle accident recording device and a video played in a mobile terminal of a watch type according to one embodiment of the present invention. Particularly, FIG. 8B shows one example of a moving image in the course of taking images through the vehicle accident recording device.

Referring to FIG. 8B, if the vehicle accident recording device receives a request for sensing a moving image from the mobile terminal, the vehicle accident recording device can send the mobile terminal a moving image related to a state change of a user. In this case, the moving image related to the state change may correspond to a video amounting to a preset period T before and after with reference to a time point Ta of sensing the state change of the user. Regarding this, as mentioned in the foregoing description with reference to FIG. 8A, since the vehicle accident recording device is in the continuous (always-on) video recording mode, it is possible to obtain the video taken or recorded before receiving the video request from the mobile terminal.

If the mobile terminal receives the video from the vehicle accident recording device, the mobile terminal can play the video from a play start time point Tb on the display unit. Moreover, the play start point Tb may be different from a video start time point. referring to FIG. 8B, the play start time point Tb may coincide with the state change time point Ta of the user. In particular, the mobile terminal can output the received video by starting with a video corresponding to the time point of sensing the state change of the user. The reason for this is that a time point of a video desired to be checked by a user is proximate to the time point of sensing the state change.

Meanwhile, if a voice signal sensed from a user exceeds a preset range, the mobile terminal can send a signal for requesting audio data to the vehicle accident recording device [not shown in FIG. 8A or FIG. 8B]. In this case, the audio data may correspond to audio data sensed during a preset time before and after the timing point of sensing the state change of the user. Regarding this, assume that the vehicle accident recording device is continuously recording the audio data in the continuous (always-on) video recording mode. Moreover, the vehicle accident recording device can send the mobile terminal the audio data related to the state change. Through this, the user can re-check the conversation contents performed in the vehicle before and after a time point of increasing voice.

FIG. 9 is a diagram for one example of playing a video received from a vehicle accident recording device in a mobile terminal of a watch type according to one embodiment of the present invention.

In particular, if a video is received from the vehicle accident recording device according to the embodiment described with reference to FIG. 8A, FIG. 9 shows a method of playing the received video through the display unit of the mobile terminal. Moreover, according to the embodiment shown in FIG. 9, assume that a user currently wearing the mobile terminal 10 is on the vehicle. And, the embodiment shown in FIG. 9 corresponds to a case of receiving the moving image from the vehicle accident recording device according to the embodiment shown in FIG. 9A.

Referring to a first diagram shown in FIG. 9, the mobile terminal can output a notification indicating a received video to a display unit 151. In the example shown in FIG. 9, the notification may be provided in text form or through at least one of various types such as icon, audio, vibration and the like. And, the mobile terminal can simultaneously output a play icon 910 of the received video together with the notification. In doing so, the mobile terminal can sense a first input signal 920a for the play icon 910. In this case, the first input signal 920a may correspond to user's touch input for playing the video received from the vehicle accident recording device.

Referring to a second diagram shown in FIG. 9, in response to the first input signal 920a, the mobile terminal can play a received moving image on the display unit 151. In doing so, the mobile terminal can output a time line 930 and at least one thumbnail image 940 to the currently played moving image. In this case, the time line 930 can display a play time of a currently played video, a current play position, a state change sensed point 935, and the like. According to the embodiment described with reference to FIG. 9, the mobile terminal plays the received video by starting with the state change sensed point 935. Moreover, the at least one thumbnail image 940 can indicate user's state change sensed point in the video.

Meanwhile, the time line 930 may display an indicator indicating a different time point as well as the state change sensed time point 935. In this case, the different time point does not belong to a different time point of sensing a state change of the user or a preset range of a state change of the user but may correspond to a time point of sensing a change proximate to the preset range. In particular, the different time point may correspond to a time point of sensing a signal different than usual from the user. Moreover, the mobile terminal can output a thumbnail image 940 representing a different time point by being proximate to an indicator indicating the different time point outputted to the time line 930.

Meanwhile, the user may intend to check a video taken at a different time point in the course of playing the video. In doing so, the mobile terminal can sense a second input signal 920b for the at least one thumbnail image 940. In this case, the second input signal 920b may correspond to a signal for playing the video at the different time point. Referring to a third diagram shown in FIG. 9, in response to the second input signal 920b, the mobile terminal can play a video 950 on the display unit 151 by starting from a time point corresponding to the thumbnail.

On the other hand, the mobile terminal can save a moving image or a still image outputted to the display unit [not shown in FIG. 9]. In doing so, the mobile terminal can save a shot place information, a time information, a user's state information and the like as well as the moving or still image.

Figure 10:
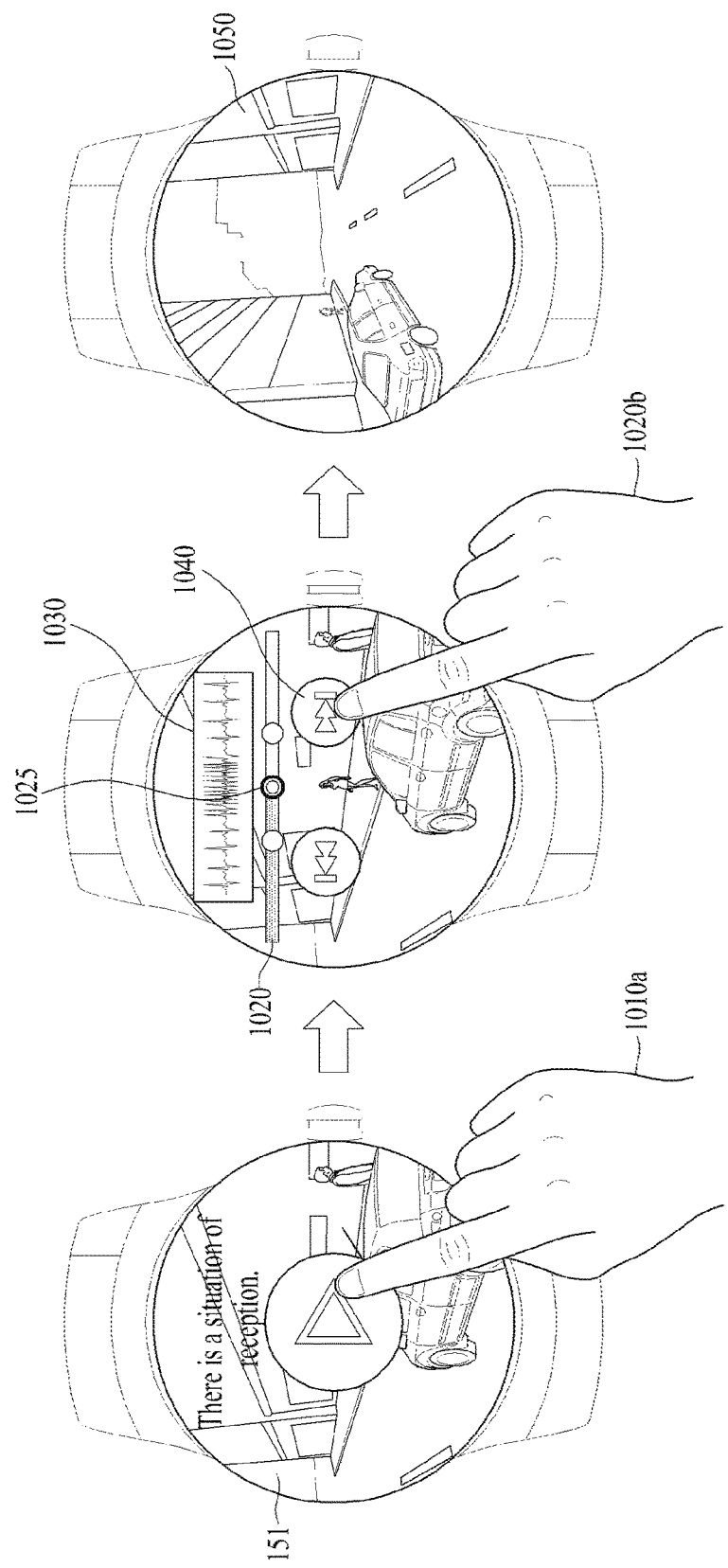
FIG. 10 is a diagram for another example of playing a video received from a vehicle accident recording device in a mobile terminal of a watch type according to one embodiment of the present invention.

FIG. 10 is a diagram for another example of playing a video received from a vehicle accident recording device in a mobile terminal of a watch type according to one embodiment of the present invention.

In particular, if a state change is recognized based on user's heart rate, FIG. 10 shows a method of playing a video related to the state change in the mobile terminal. Substances redundant with the former description with reference to FIG. 9 shall be omitted from the description of the embodiment shown in FIG. 10. Moreover, the embodiment shown in FIG. 10 corresponds to a case of receiving a moving image from the vehicle accident recording device in the former embodiment described with reference to FIG. 8A. And, according to the embodiment shown in FIG. 10, a state change is sensed based on user's heart rate.

Referring to a first diagram shown in FIG. 10, a mobile terminal can sense a first input signal 1010a for a play icon outputted to a display unit 151. In this case, the first input signal 1010a may correspond to a signal identical to the former first input signal described with reference to FIG. 9.

If so, referring to a second diagram shown in FIG. 10, the mobile terminal can play a moving image received from a vehicle accident recording device. In this case, the mobile terminal can output a time line 1020 and a heart rate graph 1030 to a currently played video. For instance, the heartrate graph 1030 may correspond to a heart rate sensed from a user at a time point of recording the received video. Moreover, if the first input signal 1010a is sensed, the mobile terminal can play the video by starting from a state change sensed time point 1025. Moreover, an indicator outputted before or after the state change sensed time point 1025 to the time line 1020 may correspond to a time point having a heart rate lower than that of the state change sensed time point but higher than user's normal heart rate. According to the embodiment shown in FIG. 9, the state change sensed time point may correspond to a time point having a highest heart rate.

Meanwhile, the mobile terminal can output a forward/backward shift icon 1040 to the currently played video in a manner that the forward/backward shift icon 1040 overlays the currently played video. In this case, the forward/backward shift icon 1040 may correspond to an icon configured to change a play position to a higher heart rate time point situated before or after a current play time point. Hence, if a second input signal 1010b for the forward/backward shift icon 1040 is sensed, the mobile terminal can output the video by changing a play position to a highest heart rate time point 1050 situated after the current play time point.

According to the embodiment shown in FIG. 10, a state change is sensed with reference to user's heart rate, by which the present invention is non-limited. In particular, if the mobile terminal senses a state change with reference to a level of a shaking of the mobile terminal, the mobile terminal can output a graph indicating the level of the shaking to the display unit. Moreover, if the mobile senses a state change based on a size of a voice signal of a user currently wearing the mobile terminal, the mobile terminal may output a graph indicating the size of the voice signal to the display unit.

According to the embodiments described with reference to FIG. 9 and FIG. 10, the moving image is received from the vehicle accident recording device. Yet, it may happen that the mobile terminal receives a still image from the vehicle accident recording device. In this case, the mobile terminal can output a notification indicating that there is the received still image to the display unit. Moreover, if an input signal is sensed, the mobile terminal can output the still image to the display unit. In doing so, if there are a plurality of still images, the mobile terminal may be able to output a thumbnail image list indicating a plurality of the still images to the display unit. Moreover, the example of switching the video to a different time point in FIG. 9 or FIG. 10 may be identically implemented in still image(s).

Figure 11A:
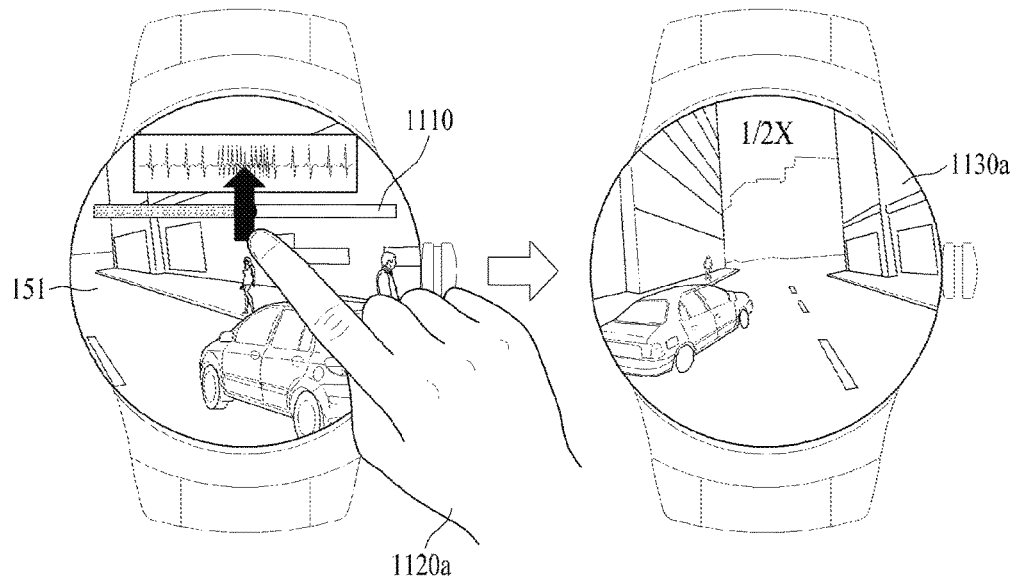
FIGS. 11A and 11B are diagrams for one example of adjusting a speed of a moving image played in a mobile terminal of a watch type according to one embodiment of the present invention.
Figure 11B:
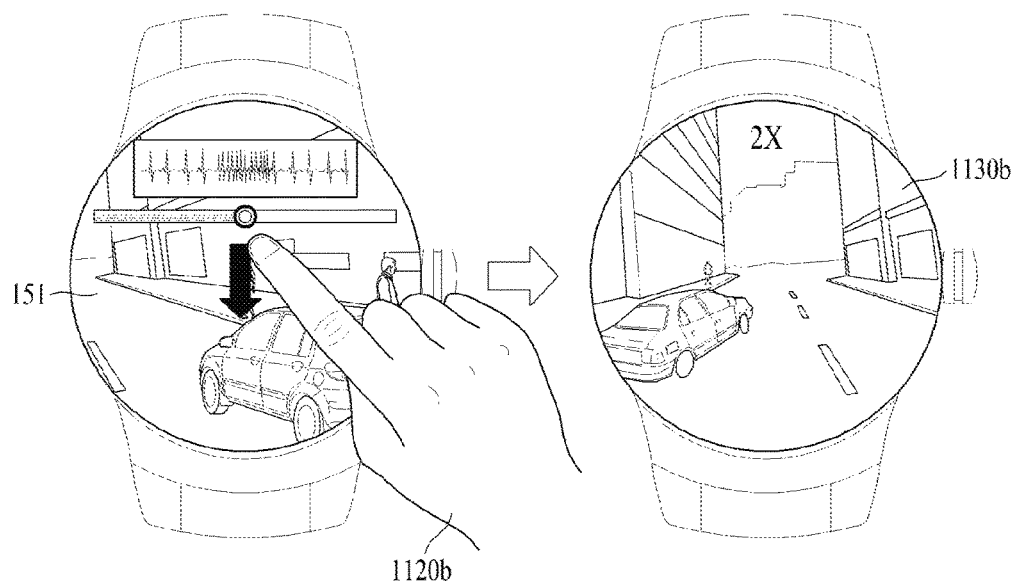

FIGS. 11A and 11B are diagrams for one example of adjusting a speed of a moving image played in a mobile terminal of a watch type according to one embodiment of the present invention. The embodiment shown in FIG. 11 shows a case that a different input signal is sensed in the state shown in the second diagram of FIG. 9 or FIG. 10. Substances redundant with the former description with reference to FIG. 9 or FIG. 10 shall be omitted from the description of the embodiment shown in FIG. 11.

Referring to FIG. 11A, a mobile terminal can output a time line 1110 to a display unit 151 while a received video is played. And, the mobile terminal can sense an input signal 1120a sensed from a currently played point on the time line 1110. In this case, the input signal 1120a may correspond to a drag touch applied in a top direction. If so, the mobile terminal can play the video at ½× speed by starting from a current play time point.

On the other hand, referring to FIG. 11B, the mobile terminal can sense an input signal 1120b sensed from a currently played point on the time line 1110. In this case, the input signal 1120b may correspond to a drag touch applied in a bottom direction. If so, the mobile terminal can play the video at 2× speed by starting from a current play time point.

Through the above-described embodiment, a user can watch an accident scene part in a video in detail and is able to quickly pass unimportant scenes.

Meanwhile, the present invention is non-limited by the above embodiment described with reference to FIG. 11. Alternatively, the play speed can be adjusted inversely in response to a direction of the input signal. For instance, if a drag touch applied in the top direction is sensed from the time line, the mobile terminal can play a video more quickly. For another instance, if a drag touch applied in the bottom direction is sensed from the time line, the mobile terminal can play a video more slowly.

On the other hand, in response to a drag touch applied in a top/bottom direction, the mobile terminal can play a video by zoom-in as well as the play speed adjustment [not shown in FIG. 11]. For instance, if a drag touch applied in the top direction is sensed from the time line, the mobile terminal can output a currently played video by enlarging (or, zooming in on) the currently played video.

FIGS. 12A and 12B are diagrams for one example of setting a theme of a video received from a vehicle accident recording device in a mobile terminal of a watch type according to one embodiment of the present invention.

First of all, as mentioned in the foregoing description with reference to FIG. 8A, a mobile terminal can receive an image from a vehicle accident recording device. In this case, the mobile terminal can output a setting menu of the received image to a display unit 151. In this case, the setting menu correspond to a menu for determining whether to save an image recorded through the vehicle accident recording device to a specific item. For instance, the mobile terminal can output the setting menu before sensing an input signal for an image play from a user. For another instance, the mobile terminal can output the setting menu after completion of an image play.

Referring to FIG. 12A, the mobile terminal can output a setting menu configured with such a text as 'Theme of image?' to the display unit 151. In doing so, the mobile terminal can sense an input signal 1210 for the display unit 151. In this case, the input signal 1210 may correspond to a signal of scrolling the setting menu. For instance, the input signal 120 may correspond to one of a touch input of dragging the display unit 151 in top/bottom direction, an input of applying a drag or scroll along an edge of the circular display unit 151, an input of rotating a crown (not shown in the drawing), and the like.

If so, the mobile terminal can output an image theme list 1220 to the display unit 151. For instance, the image theme list 1220 may include 'frequent police crackdown zone', 'previously attended school', 'date course' and the like. And, a new theme item can be created in the image theme list 1220 by a user input. A user can set a theme of a video received from the vehicle accident recording device by selecting the theme from the image theme list 1220.

After the theme of the received image has been set, the mobile terminal can provide an image saved in a gallery thereafter together with the theme item of the image. Moreover, when the saved images are searched, the mobile terminal can provide an information on a state change of a user, a location information and the like as well. Referring to FIG. 12B, the mobile terminal can provide the images in a manner of sorting the images by 'normal shot images' and 'black box (vehicle accident recording device) recorded images' 1230 as sub-items in a gallery application. Moreover, according to the embodiment shown in FIG. 12B, the mobile terminal can output to provide a thumbnail of a corresponding image, a theme of an image, a date, a place, and a heart rate together.

Figure 13:
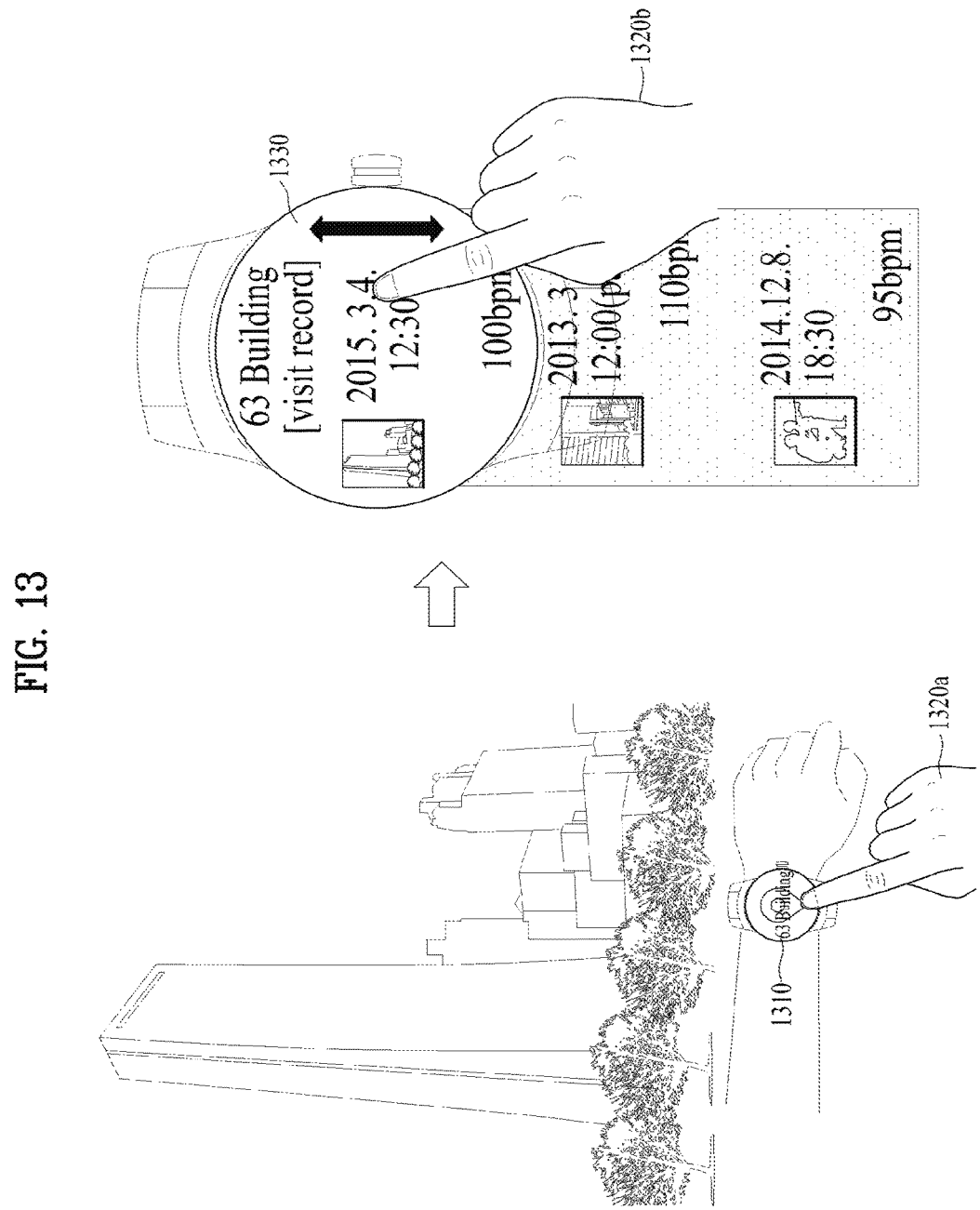
FIG. 13 is a diagram for one example of providing a user with a record at a specific place if a mobile terminal of a watch type according to one embodiment of the present invention is situated at the specific place.

FIG. 13 is a diagram for one example of providing a user with a record at a specific place if a mobile terminal of a watch type according to one embodiment of the present invention is situated at the specific place.

First of all, a mobile terminal can sense a place information on a mobile terminal located place through a sensing unit. In this case, referring to a first diagram shown in FIG. 13, the mobile terminal can output a popup 1310 indicating a current location to a display unit. In doing so, the mobile terminal can sense a first input signal 1320a. In this case, the first input signal 1320a may correspond to an input for checking a record related to the current location.

If so, the mobile terminal can output the record 1330 related to the current location to the display unit. For instance, the record 1330 related to the current location may include a moving or still image received from a vehicle accident recording device and a moving or still image photographed by a user through the mobile terminal. Moreover, the record 1330 related to the current location may include a state change of a user related to the moving or still image, a time, a thumbnail image and the like. In particular, as shown in a second diagram shown in FIG. 13, the mobile terminal can save user's heart rate together on sensing the still or still image.

Figure 14:
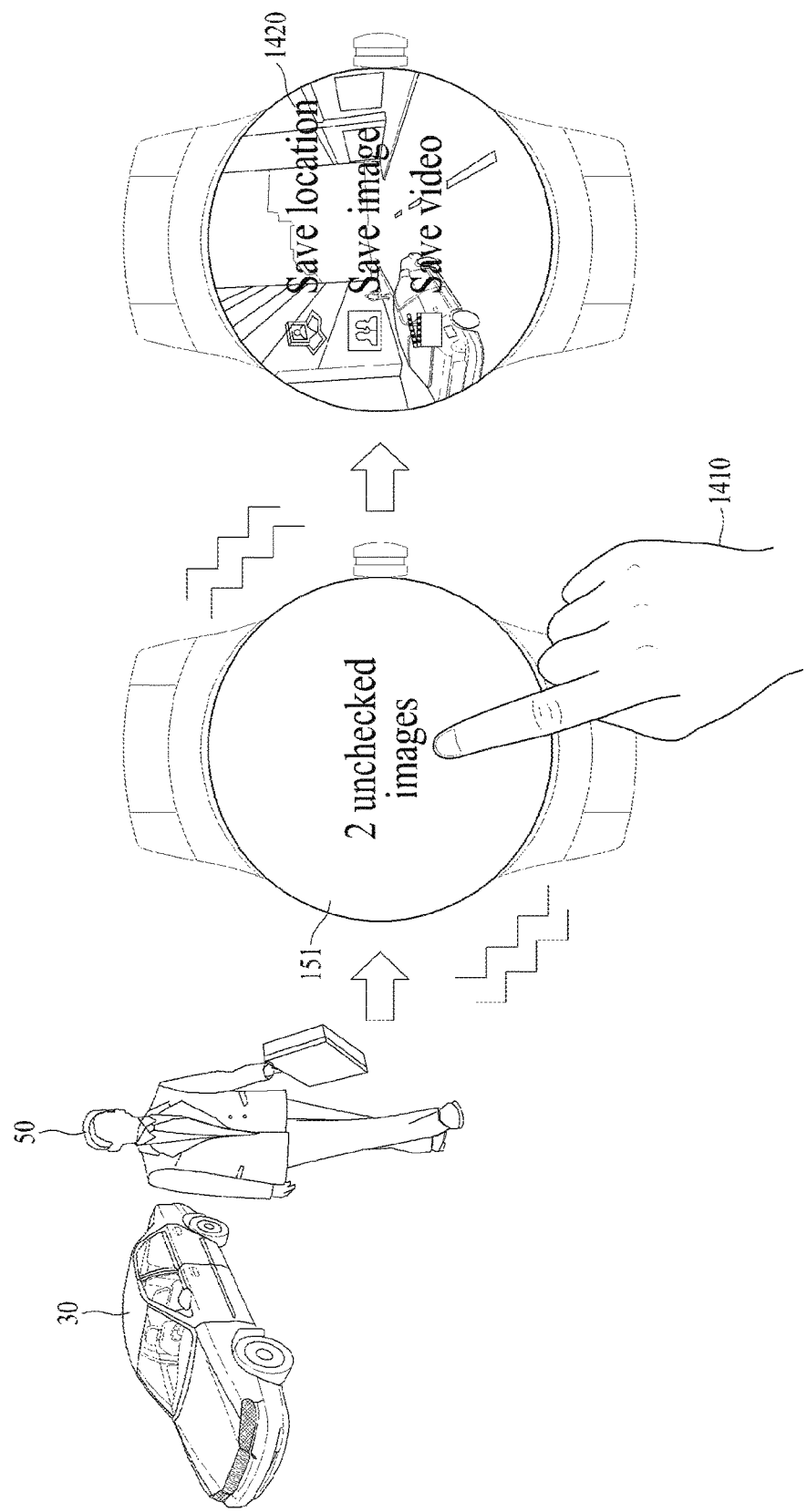
FIG. 14 is a diagram for one example of providing an image if a user currently wearing a mobile terminal of a watch type according to one embodiment of the present invention alights from a vehicle.

FIG. 14 is a diagram for one example of providing an image if a user currently wearing a mobile terminal of a watch type according to one embodiment of the present invention alights from a vehicle. According to the embodiment shown in FIG. 14, if a user on board does not check a video received from a vehicle accident recording device, a method of informing the user of an unchecked video is described.

Referring to FIG. 14, a vehicle 30 can sense a state that a user 50 currently wearing a mobile terminal alights from the vehicle 30. For instance, if a weight sensed from a vehicle seat is equal to or smaller than a preset value or a strength of a signal gets weak due to an increasing distance between the vehicle 30 and the mobile terminal 10, the vehicle 30 can determine that the user 50 currently wearing the mobile terminal 10 has alighted from the vehicle 30.

If so, the vehicle 30 can send a signal indicating the vehicle alighting state to the mobile terminal 10. If the mobile terminal 10 receives the signal from the vehicle 30, the mobile terminal 10 can provide the user 50 with a notification indicating a presence of an unchecked moving or still image. For instance, the mobile terminal 10 can provide a text notification such as '2 unchecked images' to the display unit 151. Moreover, for instance, the mobile terminal 10 can provide the notification in a manner of generating a sound or vibration.

If so, referring to a second diagram shown in FIG. 14, the mobile terminal can sense an input signal 1410. In this case, the input signal 1410 corresponds to a signal for checking an unchecked image. If so, referring to a third diagram shown in FIG. 14, the mobile terminal can play a moving image on a display unit 151. Alternatively, the mobile terminal may output a still image to the display unit 151 [not shown in FIG. 14]. Moreover, the mobile terminal can output an icon for saving a video or image shot location, an image save icon, a video save icon and the like. Through this, a user can determine whether to save the video or image received from the vehicle accident recording device.

Meanwhile, there may exist a plurality of unchecked moving images and a plurality of unchecked image [not shown in FIG. 14]. In this case, in a state of a third drawing shown in FIG. 14, the mobile terminal can sense a swipe touch input to the display unit 151. If so, the mobile terminal may be able to output a next unchecked moving or still image.

Figure 15:
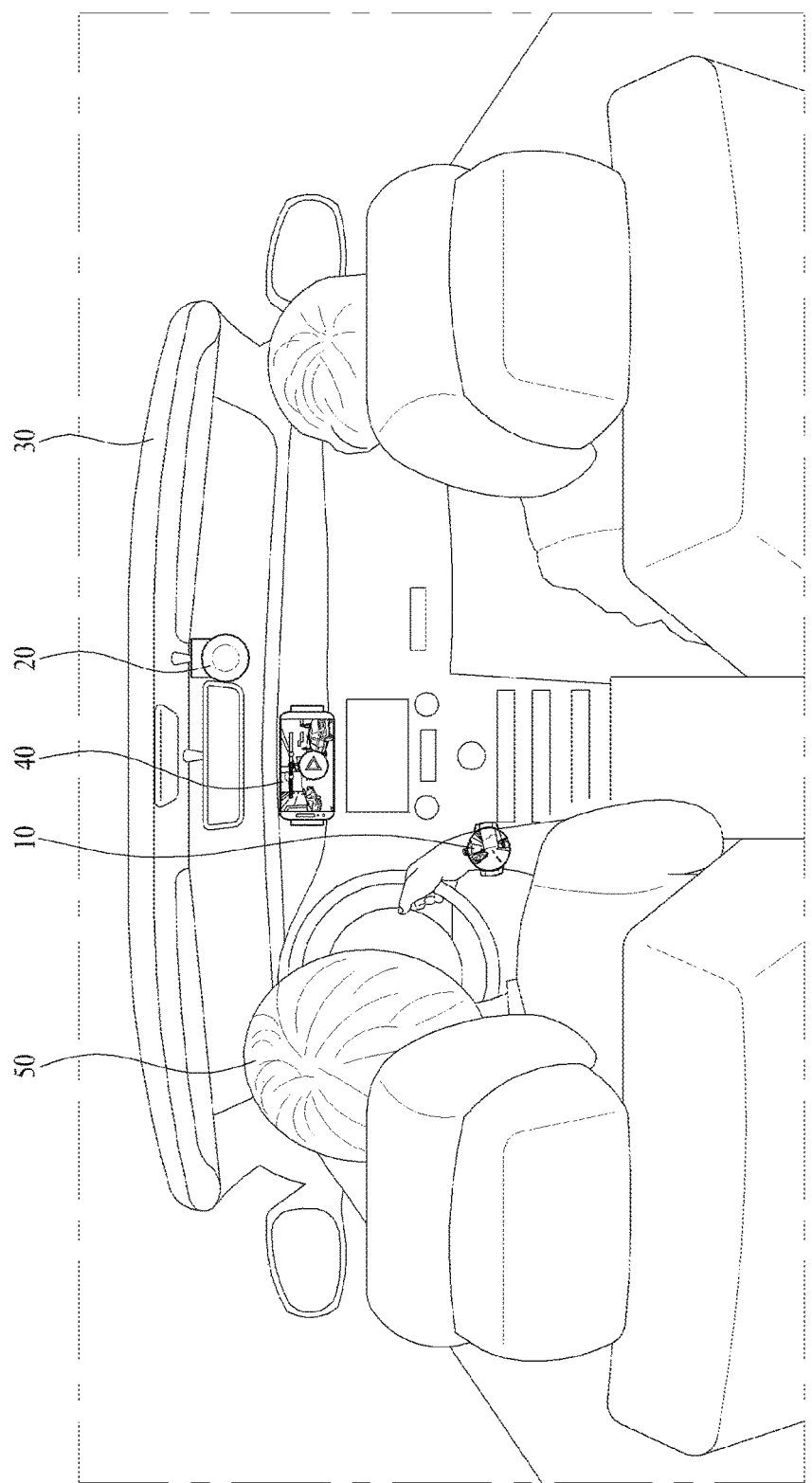
FIG. 15 is a diagram for one example of a process for a user currently wearing a mobile terminal of a watch type to play an image received from a vehicle accident recording device according to one embodiment of the present invention.

FIG. 15 is a diagram for one example of a process for a user currently wearing a mobile terminal of a watch type to play an image received from a vehicle accident recording device according to one embodiment of the present invention.

The embodiment shown in FIG. 15 corresponds to a case of receiving a moving image or a still image from a vehicle accident recording device 20 in the former embodiment described with reference to FIG. 8A. In this case, unlike the former embodiments shown in FIG. 9 and FIG. 10, a mobile terminal can be additionally paired with an external mobile terminal 40. Moreover, according to the embodiment shown in FIG. 15, assume that a user 50 is in an on-board state of a vehicle 30.

In particular, referring to FIG. 15, in case of receiving a moving image or a still image from the vehicle accident recording device 20, the mobile terminal 10 can output the still image to a display unit of the mobile terminal 10. And, the mobile terminal sends the moving image received from the vehicle accident recording device 20 to the external mobile terminal 40 and is then able to control the moving image to be outputted to a display unit of the external mobile terminal 40. The reason for this is described as follows. First of all, since a size of a display unit of a watch type mobile terminal is relatively small, a video play is limited. Hence, it is intended to check the moving image to be checked on a smartphone having a display unit size greater than that of the watch type mobile terminal. In doing so, although the mobile terminal 10 may forward the moving image received form the vehicle accident recording device to the external mobile terminal 40, the vehicle accident recording device 20 can directly send the corresponding moving image to the external mobile terminal 40.

Figure 16:
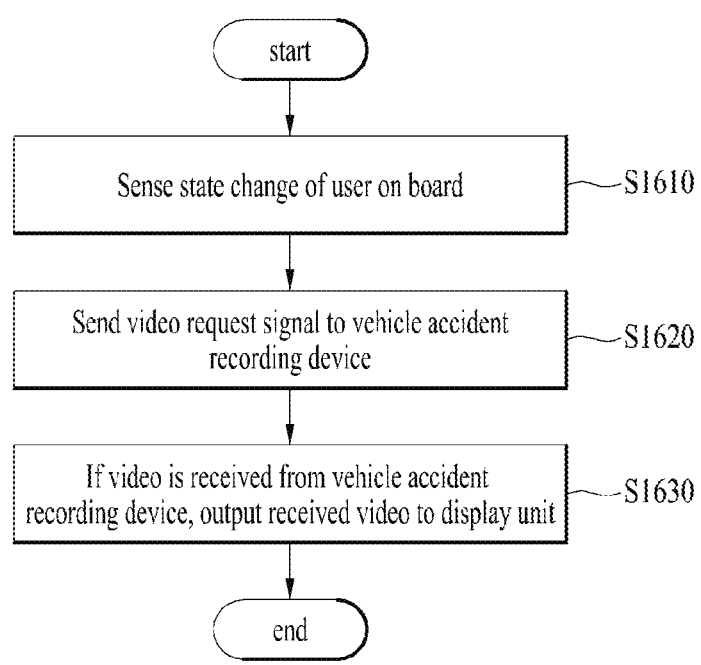
FIG. 16 is a diagram of a method of controlling a mobile terminal of a watch type according to one embodiment of the present invention.

FIG. 16 is a diagram of a method of controlling a mobile terminal of a watch type according to one embodiment of the present invention. The respective steps shown in FIG. 16 may be controlled by the former controller 180 of the mobile terminal shown in FIG. 1A.

Referring to FIG. 16, a mobile terminal of a watch type can sense a state change of an on-board user in a vehicle [S1610]. As mentioned in the foregoing description with reference to FIG. 8A, the state change may correspond to a case that a signal sensed from the user exceeds a preset range. For instance, the signal sensed form the user may correspond to one of a heart rate, a voice signal, a shaking signal of the mobile terminal, and the like.

Subsequently, the mobile terminal of the watch type can send an image request signal to a vehicle accident recording device [S1620]. As mentioned in the foregoing description with reference to FIG. 8A, the image may include at least one of a moving image and a still image. Moreover, as mentioned in the foregoing description with reference to FIG. 8B, the image may correspond to an image photographed or recorded during a preset time before and after a time point of sensing a state change.

Thereafter, if the image is received from the vehicle accident recording device, the mobile terminal of the watch type can output an image to a display unit [S1630]. As mentioned in the foregoing description with reference to FIG. 9, before outputting the moving image or the still image to the display unit, the mobile terminal can provide a notification indicating that the image has been received from the vehicle accident recording device.

Accordingly, embodiments of the present invention provide various effects and/or features.

According to at least one of embodiments of the present invention, a moment a user desires to memorize in the course of driving a vehicle can be obtained through an image recorded in a vehicle accident recording device.

According to at least one of embodiments of the present invention, while a vehicle is driven, although a situation is not recognized an event by a vehicle accident recording device, it is able to obtain an image shot by the vehicle accident recording device in a manner of sensing a state change of a driver.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A watch-type mobile terminal comprising:
a display;
a sensor;
a communication unit configured to transceive information with a vehicle accident recorder; and
a controller configured to:
measure a heart rate of a user via the sensor;
cause an image request, requesting an image, to be transmitted to the vehicle accident recorder via the communication unit when a user state change is sensed via the sensor, wherein the image corresponds to at least a moving image or a still image corresponding to a first time point related to the user state change, and wherein the user state change corresponds to an increase of the measured heart rate of the user such that the measured heart rate exceeds a preset range; and
cause the display to display a notification when the image is received from the vehicle accident recorder.

2. The mobile terminal of claim 1, wherein the controller is further configured to cause the display to display the moving image starting from the first time point when the moving image is received.

3. The mobile terminal of claim 1, wherein the image corresponds to at least a moving image or a still image captured during a preset time before and after the first time point via a camera of the vehicle accident recorder.

4. The mobile terminal of claim 1, wherein the controller is further configured to cause the display to display the moving image starting from a second time point of the moving image when a first input signal is received during display of the moving image.

5. The mobile terminal of claim 4, wherein the second time point corresponds to a time point of a state change closest to the preset range other than the first time point.

6. The mobile terminal of claim 2, wherein the controller is further configured to cause the display to change a playback speed of the moving image when a second input is received during display of the moving image.

7. The mobile terminal of claim 1 further comprising a memory, wherein the controller is further configured to cause the memory to store at least the image, a theme of the image, the user state change related to the image, or location information of the image when the image is received from the vehicle accident recorder.

8. The mobile terminal of claim 7, wherein the controller is further configured to:
receive location information of the mobile terminal via the sensor; and
cause the display to display a list including at least one image when an image related to the location information is saved in the memory.

9. The mobile terminal of claim 8, wherein the image related to the location information comprises at least an image captured by a camera of the vehicle accident recorder, an image captured by a camera of the mobile terminal, an online saved image, or an image captured by a camera of an external device.

10. The mobile terminal of claim 1, wherein the user state change is related to the user while riding a vehicle.

11. The mobile terminal of claim 10, wherein the communication unit is further configured to transceive information with the vehicle and the controller is further configured to determine whether the user is riding the vehicle based on information received from the vehicle.

12. The mobile terminal of claim 11, wherein the controller is further configured to cause the display to display a notification indicating that the image is unchecked when the user alights from the vehicle.

13. The mobile terminal of claim 2, wherein:
the communication unit is further configured to transceive information with an external mobile terminal; and
the controller is further configured to cause the communication unit to transmit a control signal for displaying the moving image on a display of the external mobile terminal.

14. The mobile terminal of claim 13, wherein the controller is further configured to cause the display to display a still image corresponding to a time point of the user state change.

15. The mobile terminal of claim 2, wherein the controller is further configured to cause the display to display a time line and further display adjacent to the time line at least:
an indicator indicating the first time point;
a thumbnail image corresponding to the first time point;
location information associated with the first time point; or
information related to a sensed value from the user corresponding to the user state change at the first time point.

16. The mobile terminal of claim 1, wherein the controller is further configured to transmit via the communication unit a voice request to the vehicle accident recorder.

17. A method of controlling a watch-type mobile terminal, the method comprising:
measuring a heart rate of a user via a sensor of the mobile terminal;
transmitting an image request to a vehicle accident recorder when a user state change is sensed, wherein the user state change corresponds to an increase of the measured heart rate of the user such that the measured heart rate exceeds a preset range; and
providing a notification indicating that the image is received when the image is received from the vehicle accident recorder,
wherein the image corresponds to at least a moving image or a still image corresponding to a first time point related to the user state change.

18. The method of claim 17, further comprising playing the moving image on a display starting from the first time point when the moving image is received from the vehicle accident recorder.

* * * * *